UNITED STATES PATENT OFFICE.

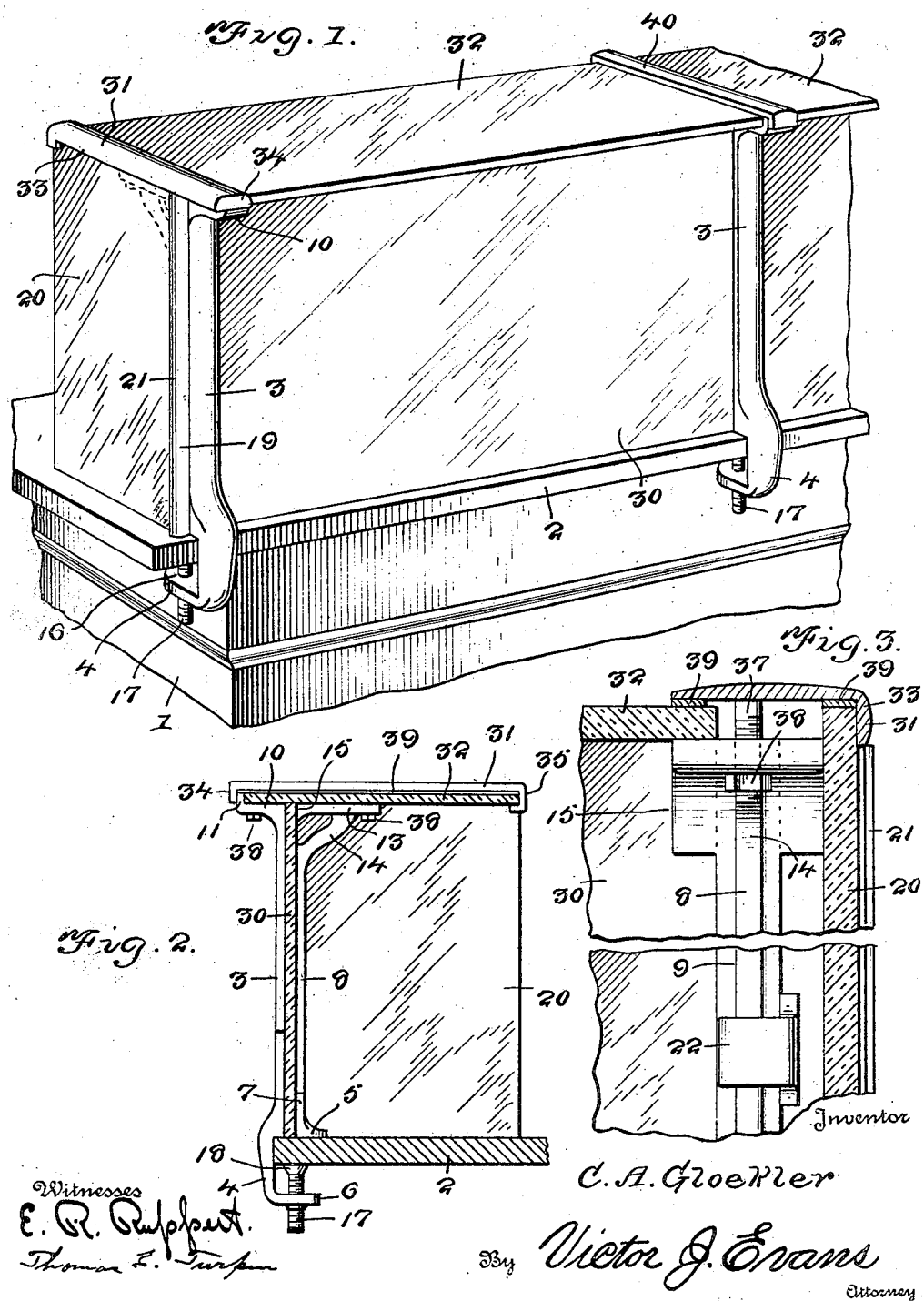

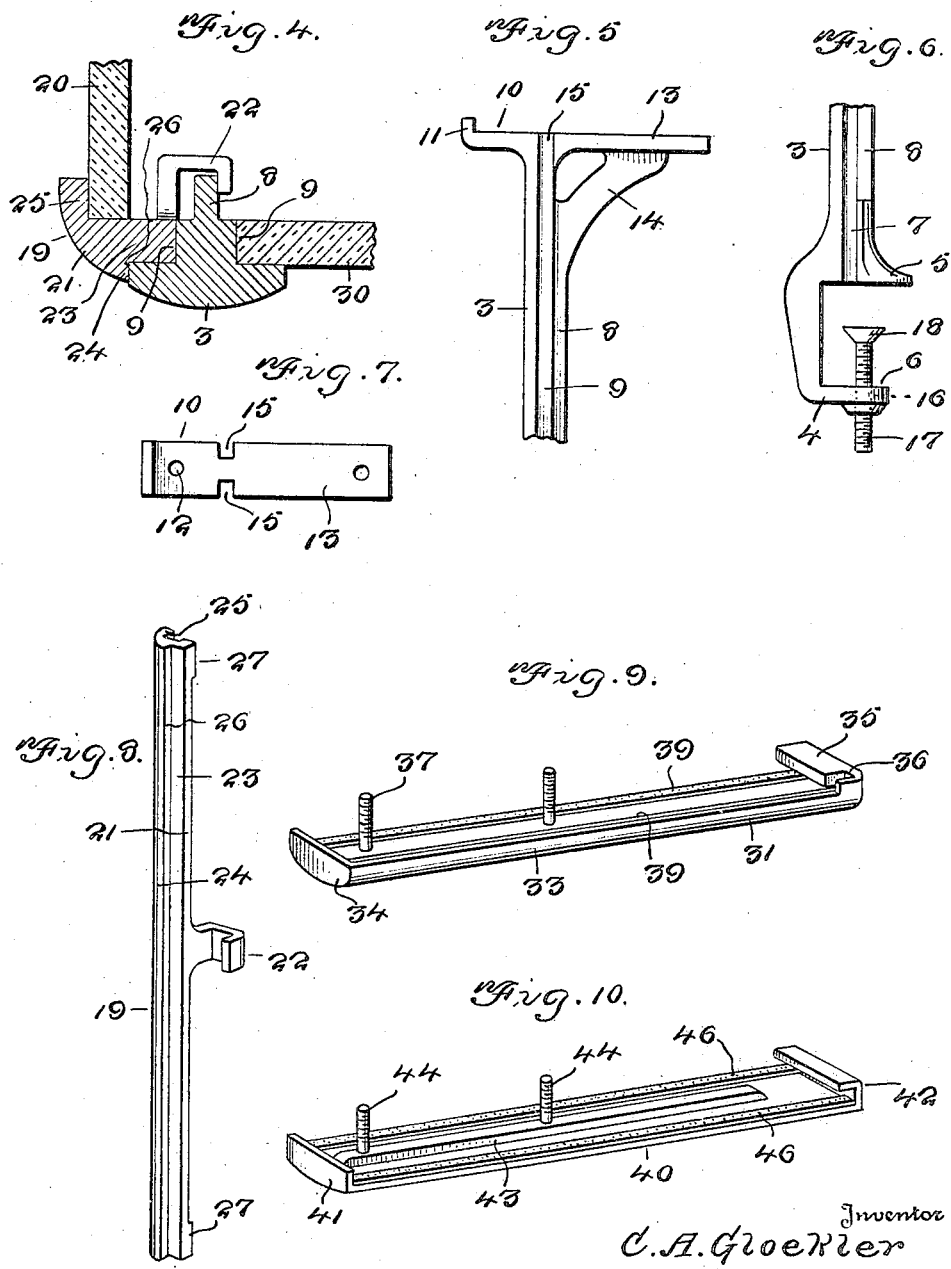

CHARLES A. GLOEKLER, OF PITTSBURGH, PENNSYLVANIA.

COUNTER-GUARD CONSTRUCTION.

1,379,553.     Specification of Letters Patent.     Patented May 24, 1921.

Application filed October 10, 1919. Serial No. 329,770.

*To all whom it may concern:*

Be it known that I, CHARLES A. GLOEKLER, a citizen of the United States, residing at Pittsburgh, in the county of Allegheny and State of Pennsylvania, have invented new and useful Improvements in Counter-Guard Constructions, of which the following is a specification.

One object of my present sole invention is the provision of a counter-guard bracket adapted to be used alone as an intermediate bracket, and also adapted in combination with a flanged attachment to constitute a highly efficient and finished end bracket. The practical advantage of this provision will be appreciated when it is stated that only one type of bracket need be constructed for use at the ends and at intermediate points of a counter guard, and the end brackets may be combined with simple flanged attachments engaged therewith, in order to enable the end brackets to adequately hold the end plates of glass comprised in the guard.

Another object of the invention is the provision of a counter-guard bracket equipped for the ready fixing of the same to a counter slab, without the employment of skilled labor.

Another object is the provision of a counter-guard bracket provided with efficient means to hold the top plates of glass comprised in the guard.

To the attainment of the foregoing, the invention consists in the improvement as hereinafter described and definitely claimed.

In the accompanying drawings, hereby made a part hereof:

Figure 1 is a perspective illustrating as applied, a portion of a counter guard constructed in accordance with my invention.

Fig. 2 is a vertical transverse section through the same.

Fig. 3 is an enlarged vertical section taken through the upper corner at one end of the guard.

Fig. 4 is an enlarged horizontal section taken through the front corner at one end of the guard.

Figs. 5, 6 and 7 are enlarged detailed views of the body comprised in each bracket.

Fig. 8 is an enlarged detail view of one of the flanged attachments for use in combination with a bracket body.

Fig. 9 is an enlarged detail view of one of the top clamps for use in conjunction with the bodies of end brackets.

Fig. 10 is an enlarged detail view of a top clamp for use in conjunction with the body of an intermediate bracket body.

Similar numerals of reference designate corresponding parts in all of the views of the drawings.

The counter 1 may be of any approved construction, and upon the same is superimposed a slab 2 with the forward edge of the slab projecting slightly beyond the forward side of the counter.

The bodies of the several brackets are identical in construction, and therefore a detailed description of the bracket body shown in Figs. 5, 6 and 7 will suffice to impart a definite understanding of all.

The bracket body alluded to is cast or otherwise formed in one piece of aluminum or other suitable metal or alloy, and is made up of a front plate 3, a clamp portion 4 at the lower end of said front plate having the upper and lower spaced walls 5 and 6 disposed at right angles to the front plate, vertical grooves 7 formed in the upper wall 5 of the clamp portion 4, a vertical central web 8 projected from the inner side of the front plate 3, and preferably stepped, as indicated by 9, an arm 10 reaching forwardly from the upper end of the front plate 3 and terminating in an upstanding flange 11 and having a vertical aperture 12, an arm 13 reaching rearwardly from the upper end of the front plate 3 and arranged with its upper side flush with that of the arm 10, an integral brace 14 interposed between the web 8 and the arm 13, and vertical grooves 15 formed between the contiguous ends of the arms 10 and 13 and arranged in vertical alinement with the before-named groove 7. Formed in the lower wall 6 of the clamp portion 4 is a vertically disposed threaded aperture 16, and bearing in said aperture is the threaded shank of a clamping screw 17, arranged with its flat head 18 uppermost, as illustrated.

At 19, and best shown in Fig. 8, is the flanged attachment of my invention for converting a stock bracket such as is used alone at an intermediate point of a counter guard, into a highly efficient end bracket—i. e., an end bracket adapted to receive and strongly and neatly hold an end plate of glass, such as indicated by 20. The said flanged attachment is formed in one piece of aluminum or other metal or alloy, and includes a body 21 and a lateral hook 22. The said body 21 comprises a plate 23, a flange 24 that reaches from one longitudinal edge of the body, and a flange 25 that reaches from the opposite side of the body 21, with reference to the flange 24, and has its outer side preferably rounded and merged into the outer side of the flange 24, and also has a square side 26 disposed at right angles to one side of the body 21 at an intermediate point in the width thereof. At the ends of the opposite side of the body 21 to the flange 24 are provided slight swells 27. The hook 22 is of general angular formation, and reaches from the inner portion of that side of the plate 23 remote from the flange 25 at about the transverse center of the attachment 19. When it is desired to convert one of the bracket bodies into an end body,—i. e., a body adapted to receive and strongly hold the forward edge of the plate 20, the plate 23 of attachment 19 is arranged against the rear side of the front plate 3 and so that the square side 26 of the flange 25 bears against the end of the front plate 3, the swell-bearing end portions of the plate 23 rest in the grooves 7 and 15 to prevent wabbling of the attachment, the hook 22 straddles the web 8 to strongly hold the attachment 19 to the body, and the inner side of the flange 25 rests in spaced relation to the side edges of the upper clamp wall 5 and the arm 13, so that a space is afforded between said flange 25 and the parts 5 and 13 for the forward edge of the glass plate 20. It will also be noticed that the lower end of the attachment 19 bears solidly on the upper side of the slab 2. Manifestly the bodies of the intermediate brackets are without attachments such as 19.

In affixing the bracket bodies to the slab 2, each body is positioned to receive the forward edge portion of the slab 2 between the clamp wall 5 and the head end of the screw 17. The said screw is then turned upwardly through the medium of a pair of pliers, until the slab portion is strongly clamped between the wall 5, on the one hand and the screw head on the other. In this connection it will be observed that the pressure of the screw head against the under side of the slab operates to effectively prevent casual loosening of the screw, with the result that the bracket body is rigidly fixed to the slab portion until the screw is turned through the medium of a pair of pliers downwardly.

It will also be understood by reference to Figs. 1 and 4, that the grooves 7 and 15 in the bracket bodies are adapted to receive the front glass plates 30 of the counter guard, and which plates bear on the upper side of the slab 2.

On each of the end bracket bodies of the guard, I employ an end top clamp 31, such as best shown in Fig. 9, the same being designed to receive one end plate of glass 20 and one top plate of glass 32. The end top clamp alluded to is formed in one piece of aluminum or other metal or alloy, and has a pendent side flange 33 at its outer edge, a pendent flange 34 at its forward end, and a downwardly and forwardly extending flange 35 at its rear end, said flange 35 having in its forwardly disposed portion adjacent to the flange 33 a notch 36, designed to receive the upper rear portion of one plate 20. The forward flange 34 of the clamp 31 is adapted to rest in lapped relation to the flange 11 on the arm 10 of the body, when the threaded shanks 37 on the clamp 31 are secured in the apertures of the arms 10 and 13, by the nuts 38 mounted on said threaded shanks and positioned below the arms 10 and 13. At its under side the end top clamp 31 is provided with flat strips 39 designed to bear against the upper edge of one end plate of glass 20, and one top plate of glass 32, respectively, with a view to averting injury to the glass notwithstanding the tight holding of the same.

The intermediate top clamp 40 for use in conjunction with one of the intermediate bracket bodies is designed to bear upon and hold the contiguous ends of two top plates of glass 32. Said intermediate top clamp 40, which is formed in one piece of aluminum or other metal or alloy, is therefore provided at its forward end with a pendent flange 41 and at its rear end with a downwardly and forwardly extending flange 42, designed to receive the rear edge of the top glass plate 32, and is also provided at its under side with a longitudinal central rib 43, designed to rest between the contiguous ends of the top glass plates 32. Depending from the said rib 43 are threaded shanks 44 that are designed to be secured by nuts, not shown, to the arms 10 and 13 of an intermediate bracket body. It will also be noted that the clamp 40 is provided at its under side with felt strips 46 designed to bear upon the top plates of glass 32 to preclude injury to the glass, even when the plates of glass are tightly held.

It will be apparent from the foregoing that my novel construction affords a counterguard that is at once simple and inexpensive in construction and susceptible of being expeditiously and easily erected, and this without the employment of skilled labor and without the assistance of any tool, other than a pair of pliers as stated.

Having described my invention, what I claim and desire to secure by Letters-Patent, is:

1. The combination with a counter-guard bracket body having an upright front plate and an upright web reaching rearwardly at an angle from said front plate; of an upright flanged attachment arranged to bear against said front plate and having a lateral hook to reach around and straddle said web.

2. The combination with a counter-guard bracket body having an upright front plate and an upright web reaching rearwardly from said front plate, and also having a clamp body at the lower end of the front plate with vertical side grooves in the upper portion of said clamp body, and arms reaching forwardly and rearwardly from the upper end of the front plate and separated by vertical side grooves in alinement with the first-named grooves; of an upright flanged attachment arranged to rest in the side grooves and against the rear portion of said front plate and having a hook to straddle said web.

3. The combination with a counter-guard bracket body having an upright front plate and an upright web reaching rearwardly from said front plate, and also having a clamp body at the lower end of the front plate with vertical side grooves in the upper wall of said clamp body, and arms reaching forwardly and rearwardly from the upper end of the front plate and separated by vertical side grooves in alinement with the first-named grooves, of an upright attachment including a plate and swells on the end portions thereof to rest in said grooves and against the rear side of the front plate, a flange reaching rearwardly from said plate, a flange reaching forwardly from the plate and adapted to bear against the edge of the front plate, and a hook on the plate of the attachment to straddle the web of the bracket body and hold the attachment thereto.

4. The combination in a counter-guard, of a slab, an upright bracket body having a front plate and a web at the rear side of said plate and also having a clamp body at the lower end of the front plate and means complementary to said clamp body for affixing the same to the forward edge portion of the slab and further having lower and upper side grooves and forwardly and rearwardly reaching arms at the upper end of the front plate, a front glass plate resting at its lower edge on the slab and at its outer end in the inner side grooves of the bracket body, a flanged attachment resting at its lower end on the slab and also resting in the outer side grooves of the bracket body and having a hook in straddling engagement with and around the web of the bracket body, an end glass plate resting at the lower end on the slab and at its forward edge between the flanged attachment and the outer side of the bracket body, a top clamp superimposed upon and connected to the arms of the bracket body, and a top glass plate held between said top clamp and the arms of the bracket body.

In testimony whereof I affix my signature.

CHARLES A. GLOEKLER.